United States Patent
Wright

(10) Patent No.: US 10,679,270 B2
(45) Date of Patent: Jun. 9, 2020

(54) TRANSACTIONS VIA A USER DEVICE IN THE PROXIMITY OF A SELLER

(71) Applicant: PayPal, Inc., San Jose, CA (US)

(72) Inventor: Eric Stuart Wright, Omaha, NE (US)

(73) Assignee: PAYPAL, INC., San Jose, CA (US)

(*) Notice: Subject to any disclaimer, the term of this patent is extended or adjusted under 35 U.S.C. 154(b) by 333 days.

(21) Appl. No.: 15/688,331

(22) Filed: Aug. 28, 2017

(65) Prior Publication Data

US 2018/0047082 A1 Feb. 15, 2018

Related U.S. Application Data

(63) Continuation of application No. 13/909,840, filed on Jun. 4, 2013, now Pat. No. 9,747,627, which is a
(Continued)

(51) Int. Cl.
*G06Q 30/06* (2012.01)
*G06Q 30/02* (2012.01)

(52) U.S. Cl.
CPC ......... *G06Q 30/0623* (2013.01); *G06Q 30/02* (2013.01); *G06Q 30/06* (2013.01)

(58) Field of Classification Search
CPC .... G06Q 30/0623; G06Q 30/06; G06Q 30/02; G06Q 30/08
(Continued)

(56) References Cited

U.S. PATENT DOCUMENTS 8,224,718 B1   7/2012   Sholtis et al.
8,396,808 B2   3/2013   Greenspan
(Continued)

FOREIGN PATENT DOCUMENTS

JP   2002189663 A   7/2002
JP   2004118673 A   4/2004

OTHER PUBLICATIONS

Hachman, Mark, "MobilePay: Your Phone is Your Credit Card", pcmag.com, 1 pg. (2010).
(Continued)

*Primary Examiner* — Yogesh C Garg
(74) *Attorney, Agent, or Firm* — Haynes and Boone, LLP

(57) ABSTRACT

Embodiments of methods and systems are provided that allow a user to upload inventories, view inventories in the proximity of the user, and/or facilitate transactions over a user device in a simple manner. In an embodiment, a method for transactions comprises loading, by a server at a remote location, an application on a user device of a user, wherein the application allows the user to upload an inventory comprising one or more items and/or services offered for sale by the user, as well as to view on the user device other inventory offered for sale by one or more other users as the user comes into proximity of the one or more other users, and wherein an inventory list maintained at the user device is constantly updated with the other inventory viewed by the user device. The method also comprises receiving, by the server at the remote location, transaction information associated with conducting a transaction in connection with the inventory list over the user device. The method further comprises facilitating, by the server at the remote location, the transaction between the user via the user device and the one or more other users.

20 Claims, 4 Drawing Sheets

Related U.S. Application Data continuation of application No. 13/073,553, filed on Mar. 28, 2011, now Pat. No. 8,473,371.

(58) Field of Classification Search
USPC .............................................. 705/26.1, 26.9
See application file for complete search history.

(56) References Cited

U.S. PATENT DOCUMENTS

| | | | | |
|---|---|---|---|---|
| 8,588,693 | B2* | 11/2013 | Lazaridis | ............... H04L 67/34 455/41.3 |
| 2001/0007981 | A1 | 7/2001 | Woolston | |
| 2003/0004743 | A1 | 1/2003 | Callegari | |
| 2004/0107144 | A1 | 6/2004 | Short | |
| 2005/0038876 | A1 | 2/2005 | Chaudhuri | |
| 2006/0166740 | A1 | 7/2006 | Sufuentes | |
| 2007/0089168 | A1 | 4/2007 | Wang et al. | |
| 2007/0136140 | A1 | 6/2007 | Smith | |
| 2008/0015958 | A1 | 1/2008 | Vanker et al. | |
| 2008/0109317 | A1* | 5/2008 | Singh | .................... G06Q 30/02 705/14.5 |
| 2008/0222003 | A1 | 9/2008 | Adstedt et al. | |
| 2009/0187546 | A1 | 7/2009 | Hamilton Whyte | |
| 2010/0071004 | A1 | 3/2010 | Wightman | |
| 2010/0318444 | A1 | 12/2010 | Quadir | |
| 2011/0022499 | A1 | 1/2011 | Hogan | |
| 2011/0028137 | A1 | 2/2011 | Moshrefi et al. | |
| 2011/0161169 | A1 | 6/2011 | Ramesh et al. | |
| 2011/0180595 | A1* | 7/2011 | Hubler | ................. G06Q 20/341 235/375 |
| 2011/0288906 | A1* | 11/2011 | Thomas | ................. G06Q 30/02 705/7.29 |
| 2011/0314482 | A1 | 12/2011 | Cupala et al. | |
| 2012/0022934 | A1* | 1/2012 | Forlai | ............. G06Q 10/06375 705/14.23 |
| 2012/0058745 | A1* | 3/2012 | Jovicic | .................. G06Q 30/02 455/414.1 |
| 2012/0089461 | A1 | 4/2012 | Greenspan | |

OTHER PUBLICATIONS

Kessler, et al., "Data Miners Dig a Little Deeper: Companies may Know a lot More About You than You Think-or Want", USA Today, McLean, VA (2006).

Lockard, Robert, "A Brief History of Inventory Management", retrieved from inventorsystemsoftware.wordpress.com (2015).

Siegler, MG, "MobilePay May be the Death of the Wallet. Yes, for Real This Time", Tech Crunch, techcrunch.com/2010/09/28/mobilepayusa/ (2010).

\* cited by examiner

TRANSACTIONS VIA A USER DEVICE IN THE PROXIMITY OF A SELLER

RELATED APPLICATION

This application is a continuation of U.S. patent application Ser. No. 13/909,840, filed Jun. 4, 2013, now U.S. Pat. No. 9,747,627 which is a continuation of U.S. patent application Ser. No. 13/073,553, filed on Mar. 28, 2011, now U.S. Pat. No. 8,473,371, the contents of which are incorporated herein by reference in their entirety.

BACKGROUND

Technical Field

Embodiments of the present disclosure generally relate to transactions, and more particularly, to methods and systems for transactions conducted via a user device in the proximity of a seller.

Related Art

A customer regularly searches for, purchases and pays for products and/or services from online sellers over communication networks, such as the Internet. At times, a customer engages in transactions at a seller's location and uses a transaction card or cash for payment. Routinely, customers engage in transactions with a variety of sellers by using their mobile device. However, typical ways of engaging in such transactions and making payments may be cumbersome and inconvenient. For example, a customer may not have enough cash for payment in connection with a transaction at a seller's location, or a seller may not be set up to run a credit card for payment. In electronic commerce, a common way of making payments over the Internet includes using a credit card. Use of a credit card may be inconvenient in that it requires, for example, a user to enter credit card information for each purpose, which may be especially cumbersome when using a mobile device. Accordingly, there is a need for a simple way of conducting transactions.

SUMMARY

As will be further described herein in relation to various embodiments, methods and systems for transactions conducted via a user device are provided, allowing a user to easily conduct transactions when the user comes into a proximity of a seller.

In accordance with an embodiment of the disclosure, a method for transactions comprises loading, by a server at a remote location, an application on a user device of a user, wherein the application allows the user to upload an inventory comprising one or more items and/or services offered for sale by the user, as well as to view on the user device other inventory offered for sale by one or more other users as the user comes into proximity of the one or more other users, and wherein an inventory list maintained at the user device is constantly updated with the other inventory viewed by the user device. The method also comprises receiving, by the server at the remote location, transaction information associated with conducting a transaction in connection with the inventory list over the user device. The method further comprises facilitating, by the server at the remote location, the transaction between the user via the user device and the one or more other users.

In accordance with another embodiment of the disclosure, a transaction system comprises one or more processors; and one or more memories adapted to store a plurality of machine-readable instructions which when executed by the one or more processors are adapted to cause the transaction system to: load, by a server at a remote location, an application on a user device of a user, wherein the application allows the user to upload an inventory comprising one or more items and/or services offered for sale by the user, as well as to view on the user device other inventory offered for sale by one or more other users as the user comes into proximity of the one or more other users, and wherein an inventory list maintained at the user device is constantly updated with the other inventory viewed by the user device; receive, by the server at the remote location, transaction information associated with conducting a transaction in connection with the inventory list over the user device; and facilitate, by the server at the remote location, the transaction between the user via the user device and the one or more other users.

In accordance with another embodiment of the disclosure, a non-transitory computer readable medium on which are stored computer readable instructions and, when executed by a processor, cause the processor to: load an application on a user device of a user, wherein the application allows the user to upload an inventory comprising one or more items and/or services offered for sale by the user, as well as to view on the user device other inventory offered for sale by one or more other users as the user comes into proximity of the one or more other users, and wherein an inventory list maintained at the user device is constantly updated with the other inventory viewed by the user device; receive transaction information associated with conducting a transaction in connection with the inventory list over the user device; and facilitate the transaction between the user via the user device and the one or more other users.

These and other features and advantages of the embodiments of the present disclosure will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

In accordance with various embodiments described herein, methods and systems are provided that enable a user to easily conduct transactions over a user device. A transaction application, which may be loaded on the user device from a service provider, enables the user, when the user comes into a certain proximity of one or more sellers, to see or view offers from the seller(s) including, for example, the seller(s)' inventories listed with an asking price, a photograph, a description, an icon and/or any other appropriate identifier. As such, the user device may display seller(s)' digital representation of their inventory. The user may purchase and make payments for items and/or services offered by the seller(s) when the user is in a certain proximity of the seller(s). In other embodiments, the user may be a seller and upload inventory for sale. Inventory lists may be kept and be constantly updated with new users and new inventory lists of available items and/or services. The transaction application may be provided by a service provider such as PayPal and/or eBay of San Jose, Calif.

Advantageously, a user may safely and easily conduct transactions with sellers that are associated with the service provider (or that have an active transaction application) from a location of the user that is in proximity to such sellers. For example, because the user is located in proximity of the sellers, such as in front of a seller's venue or within a standard wireless communication technology range such as a hotspot WiFi or Bluetooth range, the user may decide to purchase and pay for an item and/or service offered by the seller over a user device. The user may then transfer payment over the user device in a simple, convenient, and fast manner that is comparable to a cash transaction.

From a seller's perspective, the seller, which is associated with the service provider or has an active transaction application, may simplify transactions such as electronic payments without the need for a Point of Sales (POS) machine, laptop computer or other computing device, thus freeing up space for additional merchandise display. This may be advantageous for travelling vendors including for example, vendors that line up at art festivals, concerts, city or country festival days, sporting events and/or the like. Furthermore, this may be advantageous for sellers that typically may be a "cash only" venue as a result of the inconvenience of having power or Internet access. Such "cash only" venues may easily conduct transactions by taking payments made over a user device according to one or more embodiments of the present disclosure.

Figure 1:
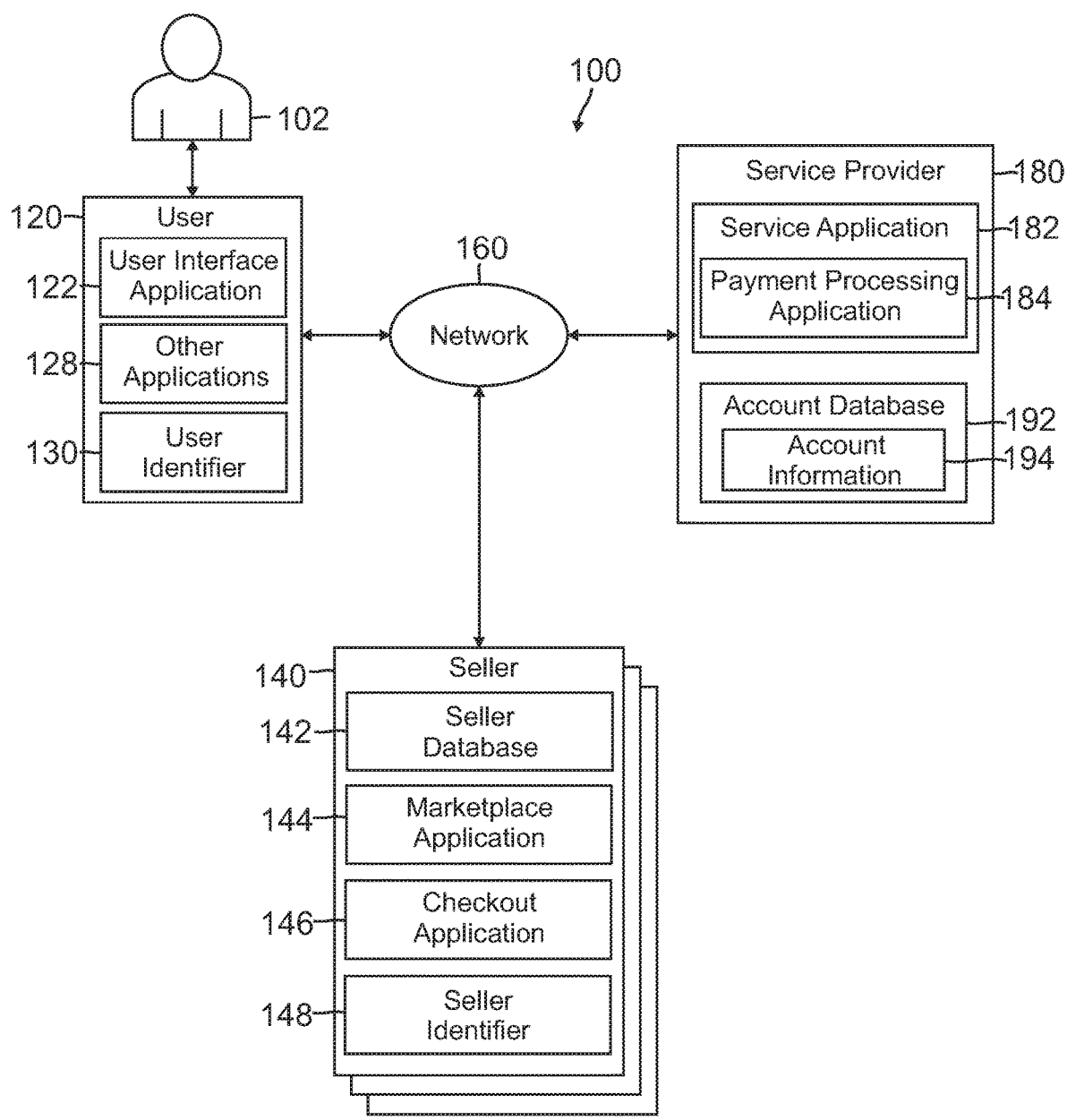
FIG. 1 is a block diagram of a transaction system using a service provider according to an embodiment of the present disclosure.

Referring now to the drawings wherein the showings are for purposes of illustrating embodiments of the present disclosure only, and not for purposes of limiting the same, FIG. 1 illustrates a block diagram of a transaction system using a service provider according to an embodiment of the present disclosure.

FIG. 1 shows one embodiment of a block diagram of a system 100 adapted to facilitate transactions via a user device 120 over a network 160. As shown in FIG. 1, the system 100 includes at least one user device 120 (e.g., network computing device), one or more seller servers or devices 140 (e.g., network server devices), and at least one service provider server or device 180 (e.g., network server device) in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user device 120, seller servers or devices 140, and service provider server or device 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 160. In various examples, the user device 120 may be implemented as a wireless telephone (e.g., cellular, mobile, etc.), a smart phone, a personal digital assistant (PDA), a personal computer, a notebook computer, and/or various other generally known types of wired and/or wireless computing devices. It should be appreciated that the user device 120 may be referred to as a client device or a customer device without departing from the scope of the present disclosure.

The user device 120, in one embodiment, includes a user interface application 122, which may be utilized by the user 102 to conduct transactions such as financial transactions (e.g., shopping, purchasing, bidding, etc.) with the service provider server 180 over the network 160. In one aspect, purchase expenses may be directly and/or automatically debited from an account related to the user 102 via the user interface application 122, in a manner as described herein.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160. In another example, the user 102 is able to access seller websites or lists of inventories via the one or more seller servers or devices 140 to view and select items and/or services for purchase, and the user 102 is able to purchase items and/or services from the one or more seller servers or devices 140 via the service provider server 180. Accordingly, the user 102 may conduct transactions such as financial transactions (e.g., view, purchase and pay for items and/or services) from the one or more seller servers or devices 140 via the service provider server 180.

The user device 120, in various embodiments, may include other applications 128 as may be desired in one or more embodiments of the present disclosure to provide additional features available to the user 102. In one example, such other applications 128 may include security applications for implementing client-side security features, programmatic client applications for interfacing with appropriate application programming interfaces (APIs) over the network 160, and/or various other types of generally known programs and/or software applications. In still other examples, the other applications 128 may interface with the user interface application 122 for improved efficiency and convenience.

According to one or more embodiments, the user interface application 122 or the other applications 128 include a transaction application that may be loaded on user device 120 by service provider server 180. Such transaction application enables user 102 to see sellers that are associated with service provider server 180 with their inventories listed as user 102 comes into a proximity of the sellers. User 102 may then decide to purchase and easily make payments for items and/or services offered by the sellers over user device 120. In various embodiments, the transaction application enables user 102 to be a buyer or a seller, that is, as an average user, user 102 may enter the free market and upload inventory to be offered for sale as will be described in further detail below.

User device 120, in one embodiment, may include at least one user identifier 130, which may be implemented, for example, as operating system registry entries, cookies associated with the user interface application 122, identifiers associated with hardware of the user device 120, or various other appropriate identifiers. The user identifier 130 may include one or more attributes related to user 102, such as personal information related to user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, user identifier 130 may be passed with a user login request to the service provider server 180 via the network 160, and the user identifier 130 may be used by the service provider server 180 to associate the user 102 with a particular user account maintained by the service provider server 180, in a manner as described herein.

The one or more seller servers or devices 140, in various embodiments, may be maintained by one or more individuals or business entities (or in some cases, by a partner of a business entity that processes transactions on behalf of business entities). It should be appreciated that individuals or business entities may also be referred to as "sellers" or "merchants" without departing from the scope of the present disclosure. Examples of sellers include individuals and also merchant sites, resource information sites, utility sites, real estate management sites, social networking sites, etc., which offer various items and/or services for purchase and payment. In some embodiments, sellers may need registration of the user identity information as part of offering the items and/or services to the user 102 over the network 160. As such, each of the one or more seller servers 140 may include a seller database 142 for identifying available items and/or services, which may be made available to the user device 120 for viewing and purchase by the user 102. It should be appreciated that although a user-seller transaction is illustrated in this embodiment, the system may also be applicable to user-user, seller-seller and/or seller-user transactions. In some embodiments, any user may be a seller or a buyer.

Each of the seller servers or devices 140, in one embodiment, may include a marketplace application 144, which may be configured to provide information over the network 160 to the user interface application 122 of the user device 120. For example, the user 102 may interact with the marketplace application 144 through the user interface application 122 over the network 160 to search and view various items and/or services available for purchase in the seller database 142. According to one or more embodiments of the present disclosure, the various items and/or services available in the seller database 142 may be displayed to user 102 via user device 120 as user 102 comes into a certain proximity (or within a certain range) of a seller.

Each of the seller servers or devices 140, in one embodiment, may include a checkout application 146, which may be configured to facilitate online financial transactions (e.g., purchase transactions) by the user 102 of items and/or services identified by the marketplace application 144. As such, in one aspect, the checkout application 146 may be configured to accept payment information from the user 102 over the network 160.

Each of the seller servers or devices 140, in one embodiment, may include at least one seller identifier 148, which may be included as part of the one or more items and/or services made available for purchase so that, e.g., particular items and/or services are associated with particular sellers. In one implementation, the seller identifier 148 may include one or more attributes and/or parameters related to the seller, such as business and banking information. User 102 may conduct transactions such as financial transactions (e.g., selection, monitoring, purchasing, and/or providing payment for items and/or services) with each seller server 140 via the service provider server 180 over the network 160.

The service provider server 180, in one embodiment, may be maintained by a transaction processing entity, which may provide processing for financial transactions and/or information transactions between the user 102 and one or more of the seller servers 140. As such, the service provider server 180 includes a service application 182, which may be adapted to interact with each user device 120 and/or each seller server 140 over the network 160 to facilitate the selection, purchase, and/or payment of items and/or services by the user 102 from one or more of the seller servers 140. In one example, the service provider server 180 may be provided by PayPal, Inc. and/or eBay of San Jose. Calif., USA.

The service application 182, in one embodiment, utilizes a payment processing module 184 to process purchases and/or payments for financial transactions between the user 102 and each of the seller servers 140. In one implementation, the payment processing module 184 assists with resolving financial transactions through validation, delivery, and settlement. As such, the service application 182 in conjunction with the payment processing module 184 settles indebtedness between the user 102 and each of the seller servers 140, wherein accounts may be directly and/or automatically debited and/or credited of monetary funds in a manner as accepted by the banking industry.

The service provider server 180, in one embodiment, may be configured to maintain one or more user accounts and seller accounts in an account database 192, each of which may include account information 194 associated with one or more individual users (e.g., user 102) and sellers (e.g., one or more sellers associated with seller servers 140). For example, account information 194 may include private financial information of each user 102 and each seller associated with the one or more seller servers 140, such as one or more account numbers, passwords, credit card information, banking information, or other types of financial information, which may be used to facilitate financial transactions between the user 102 and the one or more sellers associated with the seller servers 140. In various aspects, the methods and systems described herein may be modified to accommodate users and/or sellers that may or may not be associated with at least one existing user account and/or seller account, respectively.

In one implementation, the user 102 may have identity attributes stored with the service provider server 180, and the user 102 may have credentials to authenticate or verify identity with the service provider server 180. User attributes may include personal information, banking information and/or funding sources as previously described. In various aspects, the user attributes may be passed to the service provider server 180 as part of a login, selection, purchase, and/or payment request, and the user attributes may be utilized by the service provider server 180 to associate the user 102 with one or more particular user accounts maintained by the service provider server 180.

The transaction system described above with respect to the embodiment of FIG. 1 may be used to set up and facilitate transactions using a user device wherein a user may view inventories offered by sellers within a certain proximity to the user or user device. In various embodiments, the user may be a seller or a buyer.

Figure 2A:
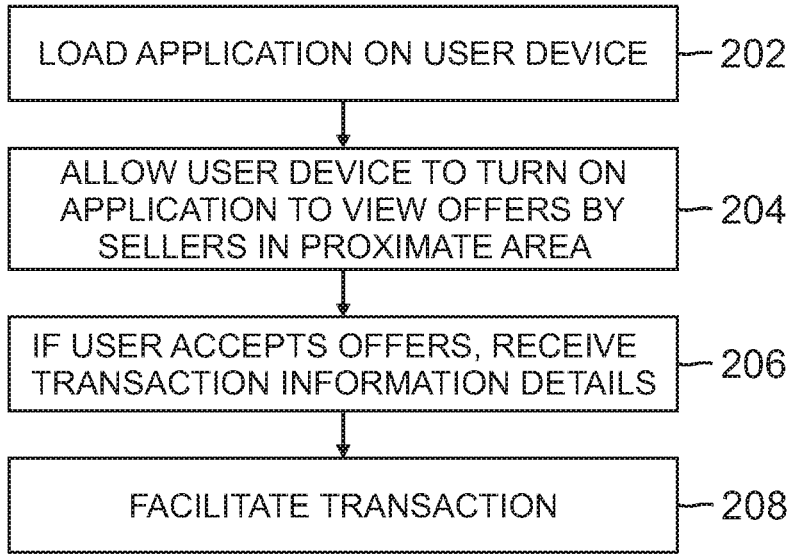
FIG. 2A is a flow diagram for facilitating a transaction using a user device according to an embodiment of the present disclosure.

Referring now to FIG. 2A, a flow diagram for facilitating a transaction using a user device is illustrated according to an embodiment of the present disclosure. According to one or more embodiments, the flow diagram of FIG. 2A may be implemented by system 100 of FIG. 1.

In block 202, when user 102 (referring also to FIG. 1) has a pre-existing account with service provider server 180 wherein user 102 has identity attributes stored with service provider server 180 as described above, user 102 may download a transaction application on user device 120 from service provider server 180. The transaction application may allow user 102 to see or view associated sellers with their listed inventories on user device 120 as user 102 comes into a certain proximity of the sellers. In one or more embodiments, the transaction application may allow any user to also be a seller and offer inventories including items and/or services for sale as will be described in further detail below with respect to the embodiment of FIG. 2B.

In block 204, user 102 may turn on the transaction application and view one or more offers by sellers in the proximity of user 102 listing their inventories. According to one or more embodiments, user 102 may be in the proximity of one or more sellers, for example, when user 102 comes within a certain distance, area or radius of the sellers, or when user 102 is within a certain standard wireless communication technology range such as a hotspot WiFi. Bluetooth range, or the like. For example, an appropriate proximity may be when user 102 comes within a radius of a seller set at approximately 100 yards, 500 yards, 1000 yards, etc., or when user 102 is standing in the vicinity, or in front of the sellers' location.

According to one or more embodiments, sellers may list their inventories including items and/or services offering such items and/or services with an asking price, one or more photographs, descriptions, icons and/or any applicable identifiers of the items and/or services. In an embodiment, user device 120 holds the sellers' digital representation of their inventory. User 102 may browse the offered sellers' inventories maintained on seller server or device 140 and may decide to purchase a selected item and/or service, as will be described in further detail with respect to FIG. 3 according to one or more embodiments.

Figure 2B:
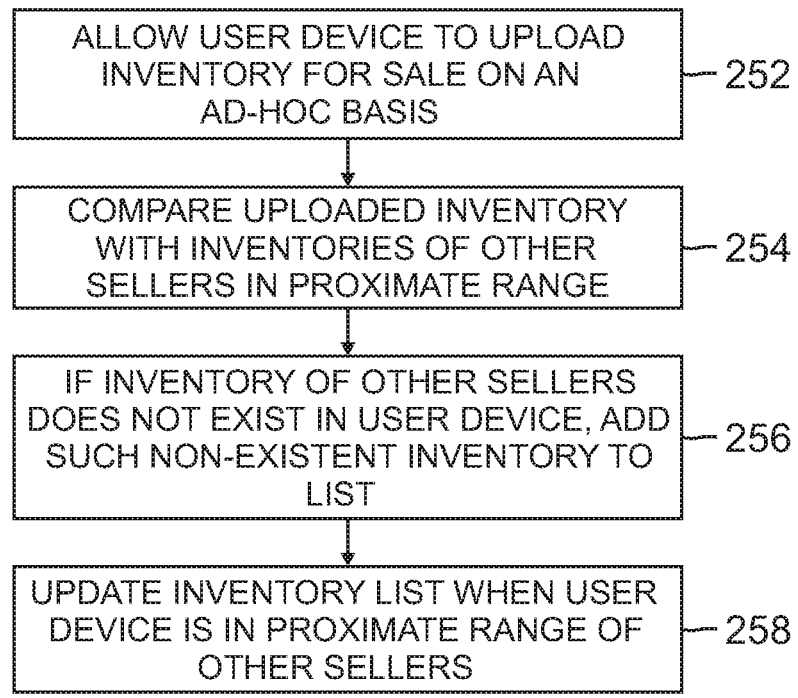
FIG. 2B is a flow diagram for updating inventory for sale on an ad-hoc basis according to an embodiment of the present disclosure.

Referring to FIG. 2B, a flow diagram for updating inventory for sale on an ad-hoc basis is illustrated according to an embodiment of the present disclosure. In block 252, any average user that may want to list items and/or services for sale, for example, on an ad-hoc basis, may use the transaction application to be a seller and upload items and/or services to be offered sale along with corresponding prices, descriptions, photographs, icons, etc. In this regard, such user may declare global variables for identification of items and/or services, for example, the user may have a unique identifier and declare a variable such as a Unique Application Identifier ("UniqueAppID") as well as Location Services ("GpsLoc"). These two variables may be used as a primary key on an ITEMS table as illustrated below in Table 1 as an example.

In an embodiment, any user that wants to sell any item and/or service may simply take a picture of the item and/or service ("image.png") with his or her user device and quickly enter a description of the item and/or service ("ItemDesc") and an asking price ("AskPrice"). Then, an Item Number ("ItemNum") may be created by using part or all of the "UniqueAppID" and adding the Item Number on a database as a self regulating incrementing number. The database may be a list that includes specific fields with built-in commands such as ADD/REMOVE and QUERY for results.

It should be appreciated that the Item Number may be tied to any appropriate identifier including a user identifier, a user device identifier such as a phone number, or any other identifier, as well as a known geo location. That is, a unique item and/or service may be uploaded and tagged with an Item Number that may reflect a unique application identifier and a geo location. In an example, if 'UniqueAppID'='123456' and the user creates a first item, then 'ItemNum'='1234560001'. All of these 6 digits of the item as well as a Date/Timestamp, asking price, item description, photo, etc., may also be added to the ITEMS table as illustrated in Table 1 below:

TABLE 1

ITEMS Table

| Unique App ID | GpsLoc | ItemNum | AskPrice | ItemDesc | Image.png | Date/Timestamp |
| --- | --- | --- | --- | --- | --- | --- |

In block 254 of FIG. 2B, when a user acting as an ad-hoc seller having a first user device with a transaction application loaded therein approaches other ad-hoc sellers or comes within a certain range, for example within a standard wireless communication technology range such as a hotspot WiFi or/Bluetooth range of any other user devices having an active transaction application loaded therein, all items listed on the ITEMS table of the first user device may be compared with listed items of other sellers within the certain range.

In block 256, once the inventories are compared, any missing unique records may be added. The first user device may then display all items and/or services available for sale that do not belong to the first user device, so that the items and/or services that the user is selling may be filtered off the user's own viewable list. That is, the transaction application of the first user device may compare each "ItemNum" corresponding to items and/or services listed by other user devices of proximate sellers, and if such items and/or services do not exist in the first user device's item list, such items and/or services may be added to the first user device's item list.

In block 258, as the first user device comes within a certain range of other sellers, the list of items and/or services may be updated with the other sellers' items and/or services. The list may be constantly updated (e.g., in the background) as the list may be ever evolving within different ranges of even further sellers.

Inventory listings of available items and/or services may be maintained by the user device based on an item identifier such as a phone number with a geo location attached to it. In this manner, the inventories are not listed just by location, for example, by state or city, but every item and/or service may be listed based on where the user device has been or is located such that the inventory listings reflect what the user device itself has seen.

By having each user device search and quickly upload entries regarding items and/or services for sale, a network is allowed to build in a geo location, which may be larger than, for example, a normal WIFI Access Point. As users walk around, the lists may get more unique sellers with general GPS location. Advantageously, an ad-hoc like network may remain or survive even if one user goes offline, for example, even if one user device's battery dies, or if users clear their own lists frequently, or other like circumstances.

According to one or more embodiments, the Date/Timestamp field (e.g. as illustrated in Table 1 above) may allow items and/or services to have a Time To Live ("TTL") status that a user's individual settings may hold. If the user wants to set his or her TTL for a certain period of time, for example a set number of hours or days, this would be of little consequence to the larger network of ad-hoc sharing. In various examples, the user may set a timeline such that entries on a list of items and/or services may be deleted when they are 24 hours old, or the list may be flushed completely.

Furthermore, the user may be allowed to control how much space to fill in the user device such as in memory. Allowing users to cap their lists of items and/or services may benefit older user devices such as smartphones. But as user devices evolve, space may increase and the user device, e.g., a smart phone, may become more similar to a POS item.

According to an embodiment, if a user would like to purchase an item and/or service, or if a user would like to request updated information, the user may be informed of a direction to head to in order to get in range of the appropriate seller. Once in range, higher resolution photos, for example, may be acquired.

In an embodiment, the transaction application may be running in the background with location services. As the user walks around, the list of items and/or services may be updated offering unique options, which the user may decide to walk to and purchase.

According to one or more embodiments of the present disclosure, the transaction application may allow a first user device to carry two sets of inventories. One inventory may include all items and/or services with corresponding photos and details taken by a first user (e.g., a "Root User" or owner of the first user device). A second inventory may include all ad-hoc shared non Root User items and/or services. With these two separate inventory lists, any user running the transaction application may turn on or off his or her own items and/or services, and also browse everyone else's on or off inventory listings.

In various embodiments, as described above, the transaction application may allow users to communicate, for example in an ad-hoc basis, a list of items and/or services to other user devices so that all items and/or services on each user device may be the same list for all the user devices. Because the transaction application according to an embodiment may transfer data in the background, for example using a simple set of logic gates to ensure only unique items and/or services are listed, and no duplicates exist on those lists, any user would only see active items and/or services in their general location. By way of example and not of limitation, this may be similar to someone connecting to a website and doing a search, wherein the website may contact a server to request available data.

Referring back to FIG. 2A, in block 206, if user 102 decides to accept a seller's offer and purchase and pay for a selected item and/or service offered by a seller in the proximity of user 102, details of the transaction may be transferred to service provider server 180. In an embodiment, once user 102 decides to purchase and pay for the selected item and/or service, service provider server 180 may be used to effect the payment. A login screen may be shown on an interface of user device 120 wherein user 102 may log in by entering, for example, a Username and Password to access his or her pre-existing account with service provider server 180 and may also choose to make payment for the selected item and/or service. In an embodiment, user 102 may review the purchase details before completing payment and may decide to change, for example, payment arrangements such as funding sources. For example, user 102 may choose a specific credit card as a funding source. Once user 102 has reviewed and agreed to the purchase details, user 102 completes payment.

In block 208, service provider server 180 may facilitate the transaction and may log and provide receipts for the transaction. As described above with respect to FIG. 1 according to one or more embodiments, service provider server 180 may facilitate the transaction via payment processing module 184 to process transactions between user 102 and each of the seller servers 140. In one implementation, payment processing module 184 assists with resolving financial transactions through validation, delivery, and settlement. As such, the service application 182 in conjunction with the payment processing module 184 settles indebtedness between user 102 and each of the sellers 140, wherein accounts may be directly and/or automatically debited and/or credited of monetary funds in a manner as accepted by the banking industry.

Figure 3:
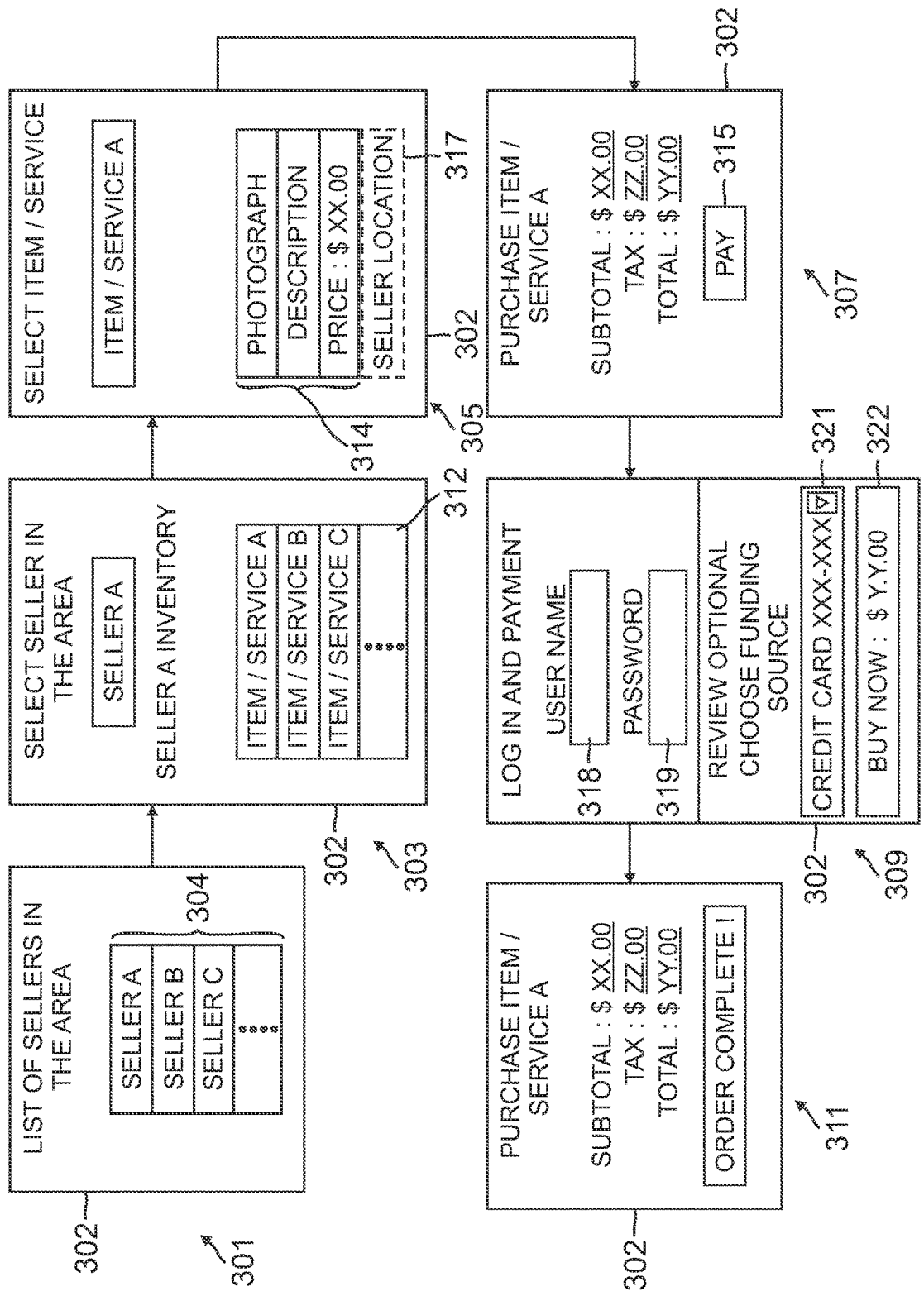
FIG. 3 is a block diagram for a transaction conducted via a user interface of a user device according to an embodiment of the present disclosure.

Referring now to FIG. 3, a block diagram for a transaction conducted via a user interface of a user device is illustrated according to an embodiment of the present disclosure. According to one or more embodiments, user device 120 of FIG. 1 may include a user interface as illustrated in FIG. 3, which may interact, for example, with user interface application 122.

When a user has a pre-existing account with service provider server 180 (also referring to FIG. 1) and user 102 has downloaded a transaction application on the user's user device from service provider server 180, user 102 may turn on the transaction application to allow user 102 to see or view sellers with their listed inventories on the user device 120 as user 102 comes into a certain proximity of the sellers. In this regard, in block 301 of the embodiment of FIG. 3, a user interface 302 of the user device may display a simple list of all sellers in the area, for example, sellers 304: Seller A, Seller B. Seller C, etc., as a user enters the proximity of such sellers. That is, when a user comes within a certain proximity or radius of sellers 304, the list of sellers in the area are displayed on user interface 302. Also, as described above with respect to the embodiment of FIG. 2B, user 102 may be able to upload his or her inventory list in an ad-hoc basis.

In block 303, the user may select to view a particular listed seller in the area. For example, the user may select Seller A, which would expand to show its corresponding inventory. Seller A's inventory may include various items and/or services 312 available and offered by Seller A.

In an embodiment, the user may be notified of sellers in the area once one is detected. Conversely, sellers may be notified of a user's request when the user is in a proximate location.

In one or more embodiments, users may take trips to establishments or events such as an in-town circus, concerts, sporting events, etc. Such trips may be easier for users having a transaction application, which allows the users to see what sellers are located in the area. Sellers associated with service provider server 180 (having an account with the server provider or an active transaction application) may display offers and inventories to such users. In one example, a user may walk up to a ticket counter at a sports event or concert to view any offered inventory, i.e., available tickets for the event. In this example, the user may go to a door or a ticket taker, who may sell the user an e-ticket to the event if maximum capacity has not been reached. In another example, bars charging a "cover charge" may be transacted via service provider server 180, for example, for those occasions when the user may want to start a tab, but did not have enough cash to get in the door. As such, the transaction application loaded on the user's user device may replace cash transactions for nearly any situation.

In block 305, the user may select a particular item and/or service from seller A, for example, an Item/Service A. User interface 302 then expands to show details 314 about Item/Service A including for example, a photograph, a description and/or a price for Item/Service A.

In one embodiment, sellers may display their location or broadcast their locations, for example, if a user optionally requests to locate a seller for the item the user has selected, for example by selecting input 317. For instance, Seller A may display its location if the user requests the location upon selecting Item/Service A.

In other embodiments, sellers may promote certain items and/or products by, for example, listing a tag line or phrase (i.e., shout out). For example, a tag line or phrase such as "Get your Popcorn here!" may be displayed as a pop-up notification on user interface 302 if the user selects it. That is, if the user chooses to see it, one-line advertisements may be displayed from sellers in the area.

In block 307, the user may decide to review and purchase Item/Service A and select an input 315 labeled "PAY" to proceed to payment.

In block 309, the user may log in to service provider server 180 and provide authentication credentials such as a Username 318 and a Password 319. However, any suitable authentication credentials may be used as may be appropriate to associate the user with a user account maintained by service provider 180. Optionally, the user may review the purchase details and may choose to, for example, choose a different funding source such as a different credit card as indicated by reference numeral 321. Once the user reviews and approves the transactions, the user may complete the transaction by selecting an interface 322 labeled "Buy Now".

Optionally, an agreement may be acknowledged prior to every transaction, stating that any transactions, e.g., purchases made via the transaction application may be covered by any Buyer protections, insurances or warranties.

In block 311, user interface 302 illustrates that the purchase for Item/Service A is completed. Optionally, a subtotal, tax and total amount may be displayed.

It should be appreciated that inputs on user interface 302 illustrated herein with respect to the embodiment of FIG. 3 may be labeled with any suitable label as appropriate for the desired purposes. Also, user interface 302 may display or utilize any suitable interfaces or inputs for entering or selecting data such as buttons, a touch screen, a keypad, a keyboard, voice recognition, or any other suitable input devices.

According to one or more embodiments, all users having a transaction application from the service provider may act as a buyer with no action required on their account and could use the transaction application to purchase available offered items once downloaded. In other embodiments, users may also act as sellers.

Sellers offering inventories via the transaction application may submit a mobile business plan and inventory for review by the service provider for potential risk detection. Accordingly, the transaction application makes it safe and easy to transact with sellers associated with the service provider as described above from a location right where the user is located. Furthermore, because the user or buyer is standing in front of the seller and it is the user's conscious decision to send a payment, no claims for example, for non-receipt, may be necessary and would not be available to the user. Also, the user or buyer may transfer small cash like payments for an item and/or service that the user is agreeing to at the speed of a cash transaction.

Figure 4:
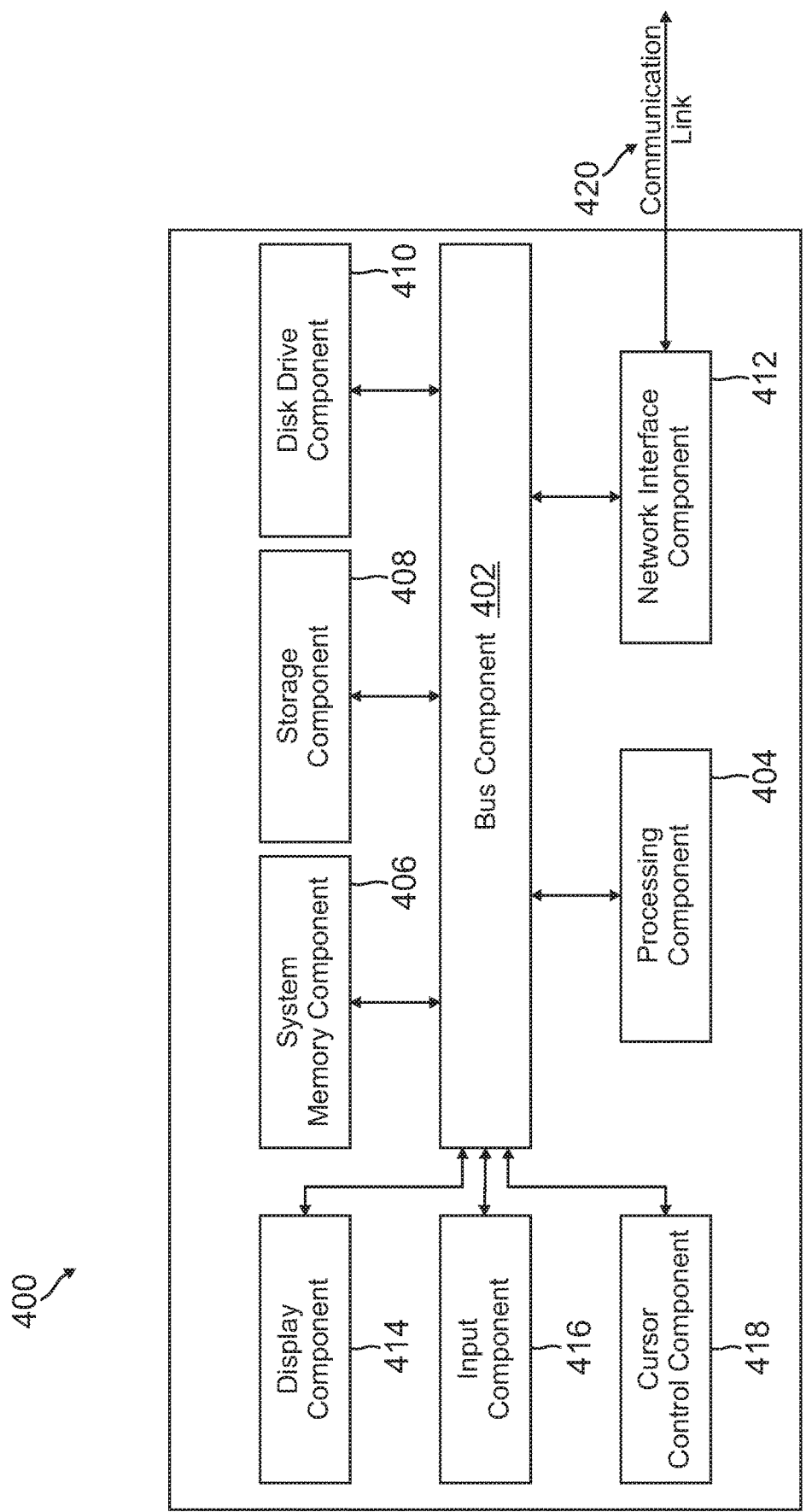
FIG. 4 is a block diagram of a system for implementing a device according to one embodiment of the present disclosure.

FIG. 4 is a block diagram of a system 400 suitable for implementing embodiments of the present disclosure, including user device 120, one or more seller servers or devices 140, and service provider server or device 180. System 400, such as part of a cell phone, mobile phone, smart phone, personal computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to process financial transactions, make payments, etc. In other embodiments, hard-wired circuitry may be used in place of or in combination with software instructions for implementation of one or more embodiments of the disclosure.

Logic may be encoded in a non-transitory computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for payments or transactions. In one example, transmission media may take the form of acoustic or light waves, such as those generated during radio wave and infrared data communications. Some common forms of computer readable media include, for example, RAM. PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 160 of FIG. 1, LAN, WLAN, PTSN, or various other wired or wireless networks) may perform instruction sequences to practice the disclosure in coordination with one another. System 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

In view of the present disclosure, it will be appreciated that various methods and systems have been described according to one or more embodiments for allowing a user to view inventories offered by sellers in the proximity of the user as well as facilitating payment options for transactions in connection with such inventories over a user device with minimal key entries.

Although various components and steps have been described herein as being associated with user device 120, seller server 140, and payment service provider server 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus the disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
detecting, at least in part via a mobile application loaded on a first mobile device, that the first mobile device is within a wireless communication range of a plurality of mobile devices that are different from the first mobile device, wherein the plurality of mobile devices are each loaded with the mobile application;
accessing available offerings of products or services associated with the plurality of mobile devices;
comparing listed offerings for sale of products or services associated with the first mobile device with the available offerings associated with the plurality of mobile devices;
determining, based on the comparing, one or more missing offerings that are missing from the listed offerings for sale associated with the first mobile device;
modifying the listed offerings for sale associated with the first mobile device by adding the one or more missing offerings;
presenting the modified listed offerings to the first mobile device while the first mobile device is within the wireless communication range;
receiving, from a user, an expiration time for at least one of the offerings; and
automatically deleting the at least one of the offerings from the modified listed offerings in response to the expiration time being reached.

2. The system of claim 1, wherein:
the detecting comprises detecting that the first mobile device is within a telecommunications protocol range of the plurality of mobile devices; and
the accessing comprises communicating with the plurality of mobile devices under the telecommunications protocol.

3. The system of claim 1, wherein the operations further comprise: updating the modified listed offerings in response to:
at least one mobile device of the plurality of mobile devices being offline or outside the wireless communication range of a rest of the mobile devices of the plurality of mobile devices; or
an additional mobile device being in the wireless communication range of the plurality of mobile devices.

4. The system of claim 3, wherein the modifying the listed offerings comprises:
adding an offering of a product or service associated with the additional mobile device.

5. The system of claim 1, wherein the operations further comprise: attaching locational information of each of the plurality of mobile devices to the offerings for sale of products or services associated therewith.

6. The system of claim 1, wherein the operations further comprise:
setting a memory space cap for storing the list; and
preventing a size of the modified listed offerings from exceeding the memory space cap.

7. The system of claim 1, wherein the operations further comprise:
receiving a request from the first mobile device to view updated information regarding an offering associated with a second mobile device of the plurality of mobile devices; and
providing directions to the first mobile device for getting to the second mobile device.

8. The system of claim 7, wherein the operations further comprise:
acquiring a higher resolution of a photo of the offering when the first mobile device is within the wireless communication range of the second mobile device.

9. The system of claim 1, wherein the presenting comprises presenting, for the first mobile device, the modified listed offerings as a first inventory and a second inventory, the first inventory corresponding to the modified listed offerings associated with the first mobile device, the second inventory corresponding to the available offerings associated with the plurality of mobile devices other than the first mobile device.

10. The system of claim 1, wherein the modified listed offerings do not include duplicated offerings from different mobile devices.

11. The system of claim 1, wherein the accessing, the comparing, the determining, the modifying, or the presenting is performed by the mobile application loaded on the first mobile device.

12. A method, comprising:
detecting, at least in part via a mobile application loaded on each of a plurality of mobile devices, that the plurality of mobile devices are within a wireless communication range of one another, the wireless communication range including a range associated with a predefined telecommunications protocol;
conducting communications under the predefined telecommunications protocol between the plurality of mobile devices;
comparing listed offerings for sale of products or services associated with each of the plurality of mobile devices with available offerings associated with a rest of the plurality of mobile devices;
determining, based on the comparing, one or more missing offerings that are missing from the listed offerings for sale associated with each of the mobile devices;
modifying the listed offerings for sale associated with each of the mobile devices by adding the one or more missing offerings;
presenting the modified listed offerings to each of the mobile devices of the plurality of mobile devices;
receiving, from a user, an expiration time for at least one of the offerings; and
automatically deleting the at least one of the offerings from the modified listed offerings in response to the expiration time being reached.

13. The method of claim 12, further comprising: in response to an additional mobile device being within the wireless communication range of the plurality of mobile devices, updating the modified listed offerings by adding an offering of a product or a service associated with the additional mobile device.

14. The method of claim 12, wherein the modified listed offerings do not include duplicated offerings from different mobile devices, and wherein the method further comprises: attaching locational information of each of the plurality of mobile devices to the available offerings of products or services associated therewith.

15. The method of claim 12, further comprising:
receiving a request from a first mobile device of the plurality of mobile devices to view updated information regarding an offering associated with a second mobile device of the plurality of mobile devices;
providing directions to the first mobile device for getting to the second mobile device; and
acquiring a higher resolution of a displayed photo of the offering when the first mobile device is within the wireless communication range of the second mobile device.

16. The method of claim 12, wherein the presenting comprises presenting, for a first mobile device of the plurality of mobile devices, the list as a first inventory and a second inventory, the first inventory corresponding to offerings associated with the first mobile device, the second inventory corresponding to offerings associated with a rest of the mobile devices of the plurality of mobile devices.

17. A non-transitory machine-readable medium having stored thereon machine-readable instructions executable to cause a machine to perform operations comprising:
communicating, via a predefined wireless communication protocol, with a plurality of mobile devices in response to the plurality of mobile devices being within a range corresponding the predefined wireless communication protocol of one another, wherein the communicating is performed at least in part using a transaction application loaded on each of the plurality of mobile devices;
accessing available offerings of products or services associated with each of the plurality of mobile devices;
comparing listed offerings for sale of products or services associated with a first mobile device of the plurality of mobile devices with the available offerings associated with a rest of the plurality of mobile devices;
determining, based on the comparing, one or more missing offerings that are missing from the listed offerings for sale associated with the first mobile device;
modifying the listed offerings for sale associated with the first mobile device by adding the one or more missing offerings;
presenting the modified listed offering to each of the mobile devices of the plurality of mobile devices;
in response to an additional mobile device coming into the range corresponding to the predefined wireless communication protocol, updating the modified listed offering by adding an offering of a product or a service associated with the additional mobile device;
receiving, from a user, an expiration time for at least one of the offerings; and
automatically deleting the at least one of the offerings from the modified listed offerings in response to the expiration time being reached.

18. The non-transitory machine-readable medium of claim 17, wherein the operations further comprise: attaching locational information of each of the plurality of mobile devices to the modified listed offerings of products or services associated therewith.

19. The non-transitory machine-readable medium of claim 17, wherein the operations further comprise:
receiving a request from the first mobile device to view updated information regarding an offering associated with a second mobile device of the plurality of mobile devices; and
providing directions to the first mobile device for getting to the second mobile device.

20. The non-transitory machine-readable medium of claim 17, wherein the operations further comprise:
setting a memory space cap for storing the list; and
preventing a size of the modified listed offerings from exceeding the memory space cap.

* * * * *